United States Patent [19]
Orikasa et al.
[11] Patent Number: 4,804,729
[45] Date of Patent: Feb. 14, 1989

[54] ELECTRICAL INSULATING MATERIAL AND POWER CABLE COMPRISING A CROSSLINKED LAYER THEREOF

[75] Inventors: Yuichi Orikasa; Shinji Kojima; Takashi Inoue, all of Kanagawa; Atsushi Sato, Tokyo; Shigenobu Kawakami, Chiba; Kaoru Yamamoto, Tokyo, all of Japan

[73] Assignee: Nippon Petrochemicals, Co., Ltd., Tokyo, Japan

[21] Appl. No.: 69,961

[22] Filed: Jul. 6, 1987

Related U.S. Application Data

[63] Continuation-in-part of Ser. No. 836,505, Mar. 5, 1986, abandoned.

[30] Foreign Application Priority Data

Mar. 8, 1985 [JP] Japan .................................. 60-46060
Oct. 21, 1985 [JP] Japan .................................. 60-235022

[51] Int. Cl.[4] ........................ C08F 2/34; C08F 236/20; C08F 236/22; H01B 3/44

[52] U.S. Cl. .................................... 526/336; 526/339; 526/913; 525/331.9; 525/332.1; 174/110 SR; 174/110 PM

[58] Field of Search ............... 525/332.1, 331.9, 332.8; 526/336, 339, 913; 174/110 SR, 110 PM; 522/186

[56] References Cited

U.S. PATENT DOCUMENTS 2,391,095 12/1945 Kellog et al. ......................... 260/79
2,591,587 4/1952 Mowry ................................ 260/669
3,345,349 10/1967 Yamada et al. ..................... 260/85.3
3,506,627 4/1970 Zaim et al. ......................... 260/80.7
3,647,767 3/1972 Cesca et al. ........................ 260/80.7
3,789,036 1/1974 Longi et al. ........................ 260/80.7
3,824,223 7/1974 Hadashi et al. ................ 260/85.3 R

OTHER PUBLICATIONS

Plastics and Processes; S. Schwartz; Van Nostrand Reinhold Company, Inc. 1982.

The Effect of Morphology on the Impulse Voltage Breakdown in XLPE Cable Insulation IEEE Transaction on Electrical Insulation, vol. EI-17, No. 5, Oct. 1983, by T. Fukuda, S. Irie, Y. Asada, the Furukawa Electric Co., Ltd.

Recent Developments in Medium Voltage and High Voltage Power Cable Insulation Compounds, Dr. Alfred Campus, BP Chemicals (SUISSE) S.A.

*Primary Examiner*—Joseph L. Schofer
*Assistant Examiner*—F. M. Teskin
*Attorney, Agent, or Firm*—Fisher, Christen & Sabol

[57] ABSTRACT

The present invention provides an electrical insulating material which comprises an ethylene copolymer prepared by subjecting, to a high-pressure radical polymerization, ethylene or a mixture of ethylene and at most 3 mol % of another monomer in the presence of one- to three-ring aromatic compound having at least two carbon-carbon double bonds, which are different from each other in reactivity in radical polymerization, in one molecule at a polymerization pressure of 500 to 4,000 kg/cm$^2$ at a polymerization temperature of 50° to 400° C., with the ethylene copolymer containing 0.005 to 1 mol % of a unit derived from the aromatic compound.

6 Claims, 1 Drawing Sheet

ELECTRICAL INSULATING MATERIAL AND POWER CABLE COMPRISING A CROSSLINKED LAYER THEREOF

This application is a continuation-in-part of U.S. application Ser. No. 836,505 filed Mar. 5, 1986, now abandoned.

BACKGROUND OF THE INVENTION (1) Field of the Invention

The present invention relates to an electrical insulating material having an improved destructive strength to impulse voltage and containing an ethylene copolymer excellent in crosslinking properties, and relates to a power cable comprising a crosslinked insulating layer containing the ethylene copolymer, and having excellent dielectric strength and heat resistance.

(2) Description of the Prior Art

Heretofore, a variety of plastic materials have been used as electrical insulating materials for power cables and the like. Among others, olefin polymers are particularly excellent in electrical and mechanical properties, chemical stability and the like. Above all, low-density polyethylenes prepared by a high-pressure radical polymerization are inexpensive and have less dielectric loss and good workability. In addition thereto, these polyethylenes can be improved in their heat resistance when crosslinked, and in these polyethylenes, a tree phenomenon resulting from the contamination with foreign matters such as catalyst residues does not occur as often as in the case of a polyethylene prepared by ion polymerization. Since having so many advantages, the low-density polyethylenes are utilized extensively as materials for electric wires and power cables.

A problem which is now present in such an insulating material for power cables is that the wall thickness of the material must be increased in proportion to a heightened voltage when a higher transmission voltage is required in accordance with the augmentation of transmission capacity. For example, in the polyethylene materials which are now used, insulation breakdown will occur unless an insulating layer is thickened to an extreme degree in order to withstand the higher voltage.

For the solution of such a problem, various improved methods have been suggested. For example, some methods have been presented in which a graft polymerization of styrene and a polyethylene is made for the sake of improving destructive strength to impulse voltage (impulse destructive strength) particularly in a high-temperature area. One of these methods is disclosed in Japanese Patent Publication No. 18760/1979, but in this method disclosed, crosslinking of polyethylene must be carried out prior to or simultaneously with the graft polymerization of styrene and the molding method is thus limited, and there is the problem that its impulse destructive strength decreases in a low-temperature section. Japanese Patent Provisional Publication No. 80605/1982 suggests a method in which ethylene polymer grains are impregnated and polymerized with an aromatic vinyl monomer in an aqueous suspension, but this method disadvantageously comprises very complicated processes.

Other methods have been further suggested in which a polyethylene or an olefin polymer is blended with an aromatic polymer such as a polystyrene (Japanese Patent Publication No. 20717/1963, and Japanese Patent Provisional Publications Nos. 142651/1975 and 54187/1977), but a compatibility between the polyethylene or the olefin polymer and the styrene polymer is disadvantageously poor.

Another suggested method comprises adding a block copolymer of styrene and a conjugated diene to a polyethylene (Japanese Patent Provisional Publication No. 41884/1977), but this method leads to the deterioration of heat resistance and extrusion workability.

Besides, a method of impregnating an electrical insulating oil with a polyethylene has been suggested (Japanese Patent Provisional Publication No. 33938/1974), but in this method, the impregnated electrical insulating oil will be bled out during a long-term storage or by changing ambient environments, so that an effect due to the oil will be impaired inconveniently.

Further, another problem of the crosslinked polyethylene electrical cables is poor dielectric strength, which fact leads to the increase in the wall thickness of the insulating layer of the high-voltage electrical cables, that is to say, which fact causes an outer diameter of the cables to vary, with the result that the transportation and disposition of such cables will be very troublesome.

In the case that a polyethylene is employed as the insulating layer for the electrical cables, a crosslinking treatment is carried out for the improvement in heat resistance. However, in that case, the crosslinking properties of the polyethylene are not sufficient. Therefore, the improvement in high crosslinking properties, i.e., high heat resistance is being desired.

SUMMARY OF THE INVENTION

As a result of intensive investigations to overcome the above-mentioned problems, the present invention has now been achieved. That is to say, an object of the present invention is to provide an electrical insulating material containing an ethylene copolymer having an improved impulse destructive strength and excellent in crosslinking properties.

Another object of the present invention is to provide an electrical cable comprising a crosslinked insulating layer containing a novel ethylene copolymer and being very rich in crosslinking properties for enabling dielectric strength to be heightened, and retaining high dielectric strength and high heat resistance.

DETAILED DESCRIPTION OF THE INVENTION

Figure 1:
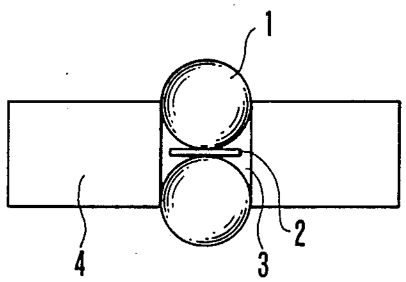
FIG. 1 is a schematic side view illustrating a Mckeown electrode for an impulse destructive test in the present invention.

The present invention provides an electrical insulating material comprising an ethylene copolymer which is prepared by subjecting, to a high-pressure radical polymerization, ethylene or a mixture of ethylene and at most 3 mol% of another monomer in the presence of one- to three-ring aromatic compounds having at least two carbon-carbon double bonds, which are different from each other in reactivity in radical polymerization, in one molecule at a polymerizatin pressure of 500 to 4,000 kg/cm$^2$ and at a polymerization temperature of 50° to 400° C., with the ethylene copolymer containing 0.005 to 1 mol% of a unit derived from the aromatic compound, and it also provides a power cable comprising a crosslinked insulating layer containing the above-mentioned ethylene copolymer.

The aromatic compound in the present invention is a compound having a non-condensed or condensed one-to three-aromatic ring and at least two carbon-carbon double bonds which are different from each other in reactivity in radical polymerization, and it may be a hydrocarbon compound or its derivative containing oxygen, sulfur, nitrogen, a halogen or the like.

The single-aromatic ring compounds include those which are derived from benzene or aromatic compounds having a cyclic side chain such as indene, and typical examples of the single-ring compounds include hydrocarbons such as 1-phenyl-1,3-butadiene, 9-phenyl-2,6-nonadiene, 3-methyl-8-phenyl-1,5-octadiene, allylstyrene, 4-styryl-1-butene, allylindene and isopropenyl styrene; and oxygen-containing compounds such as vinyl cinnamate, vinyl allylphenyl ether and allylbenzyl (meth)acrylate.

Further, two- and three-ring compounds include diaryl alkane derivatives, biphenyl derivatives and naphthalene derivatives, and their concrete examples include 1-phenyl-1-(4'-vinylphenyl)ethylene, 1,1-diphenylbutadiene, 2,4-diphenyl-1,3-pentadiene, diallylnaphthalene, diisopropenylnaphthalene, vinylallylanthracene and vinylisopropenylanthracene.

The above-mentioned aromatic compounds may be used alone or in combination of two or more thereof, and may also be employed in a combination with a by-product formed in manufacturing the above aromatic compounds.

These aromatic compounds each have a structural feature which enables them to combine as a polymeric component with a formed ethylene polymer chain in an ethylene high-pressure radical polymerization.

At least two carbon-carbon double bonds in one molecule of the above-mentioned aromatic compound must be different from each other in reactivity in radical polymerization.

This reason is as follows: If the reactivity of at least two carbon-carbon double bonds in the radical polymerization is equal, a structure of the carbon-carbon double bonds in the same substituent in the aromatic compound will be identical. For example, divinylbenzene has a stucture in which two vinyl groups are bonded to the benzene ring, and the two carbon-carbon double bonds are identical in reactivity. When the aromatic compound having two or more carbon-carbon double bonds which are equal in reactivity is radical-polymerized with ethylene, the reactivity of the two or more carbon-carbon double bonds in the radical polymerization are equal to each other, and therefore the two carbon-carbon double bonds probably take part in the polymerization together. In this case, a gel-like polymer having a three-dimensional network structure may be produced. When the ethylene copolymer having this gel-like polymer is extruded to form an insulating layer of a power cable, a multiplicity of small lugs appears on the surface of the thus extruded layer, which means that the smoothness on the surface is noticeably poor.

In consequence, the power cable manufactured by the use of such a resin has a remarkably poor dielectric strength.

The ethylene copolymer used in the electrical insulating material and the power cable of the present invention may be prepared in accordance with a radical polymerization process under a high pressure. That is to say, the radical polymerization process under high pressure is a simultaneous or step-like radical polymerization of the ethylene and the aromatic compound, as desired, and another monomer under conditions of a pressure of 500 to 4,000 kg/cm$^2$, preferably 1,000 to 3,500 kg/cm$^2$ and a reaction temperature of 50° to 400° C., preferably 100° to 350° C. in the presence of a free radical initiator and a chain transfer agent, if necessary, and an auxiliary in an autoclave or a tubular reactor. When the aromatic compound is solid, it should suitably be dissolved in a solvent and then be fed.

Examples of the above-mentioned free radical initiators include the usual initiators such as peroxides, hydroperoxides, azo compounds, amine oxide compounds and oxygen.

Further, examples of the chain transfer agents include hydrogen, propylene, butene-1, saturated hydrocarbons having 1 to 20 or more carbon atoms such as methane, ethane, propane, butane, isobutane, n-hexane, n-heptane and cycloparaffins, halogen-substituted hydrocarbons such as chloroform and carbon tetrachloride, saturated aliphatic alcohols having 1 to 20 or more carbon atoms such as methanol, ethanol, propanol and isopropanol, saturated aliphatic carbonyl compounds having 1 to 20 or more carbon atoms such as carbon dioxide, acetone and methyl ethyl ketone, as well as aromatic compounds other than mentioned above, such as toluene, ethylbenzene and xylene.

Further, the above-mentioned copolymer can contain another unsaturated monomer in addition to the ethylene, and examples of such unsaturated monomers include propylene, butene-1, pentene-1, hexene-1, 4-methylpentene-1, octene-1, decene-1, vinyl acetate, ethyl acrylate, methacrylic acid and its esters styrene, and mixtures of these monomers.

A content of the unsaturated monomer in the ethylene copolymer is within the range of 0 to 3 mol%, preferably within the range of 1 mol% or less.

A density of the ethylene copolymer is preferably within the range of 0.890 to 0.950 g/cm$^3$. Further, its melt index (hereinafter referred to as MI) preferably is within the range of 0.05 to 50 g/10 minutes, more preferably 0.1 to 20 g/10 minutes.

With regard to the unit derived from the above-mentioned aromatic compound which is to be contained in the ethylene copolymer as the polymeric component, its content is within the range of 0.005 to 1.0 mol%, preferably 0.01 to 0.7 mol%. When the content of the unit is less than 0.005 mol%, the improvement effect will scarcely be perceived. On the contrary, when it is in excess of 1.0 mol%, the impulse destructive strength will be rather poorer than in the case when the unit derived from the aromatic compound is not present; an initiator for the high-pressure radical polymerization will be largely consumed and the expensive aromatic compound will be used in great quantities, which facts are not economical; and a chain transfer reaction will be vigorous and thus a molecular weight of the ethylene copolymer will be remarkably lowered, so that a polymer unsuitable for electrical insulating materials or power cables will be prepared.

In the present invention, the ethylene copolymer may be mixed with another ethylene polymer or copolymers not containing any other aromatic unit. The composition with which the other ethylene polymer or copolymer is blended also is one of the preferable embodiments of the present invention, and so long as the content or the aromatic unit in the composition is in the range indicated above, the impulse destructive strength of the composition can be improved.

Examples of the other ethylene polymer or copolymers which can be mixed with the ethylene copolymer used for electrical insulating materials and power cables of the present invention include ethylene homopolymers; copolymers of ethylene and α-olefins each having 3 to 12 carbon atoms such as propylene, butene-1, pentene-1, hexene-1, 4-methylpentene-1, octene-1, decene-1; and styrene; copolymers of ethylene and polar group-containing monomers such as vinyl acetate, acrylic acid, ethyl acrylate, methacrylic acid, ethyl methacrylate, maleic acid and maleic anhydride; polymers prepared by modifying the ethylene homopolymers or copolymers of ethylene and other monomers with unsaturated carboxylic acids such as acrylic acid, maleic acid and their derivatives; and their mixtures.

The feature of the ethylene copolymer used for the electrical insulating materials and power cables of the present invention is to employ the aromatic compound having at least two carbon-carbon double bonds which are different from each other in reactivity in radical polymerization, and thus they are not only excellent in impulse destructive strength but also very good in crosslinking properties, since the double bonds which have not taken part in the copolymerization are left in polymeric chains.

Accordingly, when this material is used for the insulating layers in power cables, a crosslinking reaction (crosslinking efficiency) is accelerated, and the insulating layer having a high crosslinking percentage (gel fraction) is formed, so that high heat resistance is kept up. Further, high dielectric strength is also maintained therein for the following reason: that is to say, a polyethylene which has heretofore been used widely as an insulating material for power cables and the like will become poor in destructive strength to impulse voltage (impulse destructive strength), when its crystallinity is lowered, and it will also become poor in workability, when its crystallinity is inversely heightened. Generally, it is known that if a foreign component is introduced into the chain of the polyethylene, its crystallinity will deteriorate due to steric hindrance. The inventors of the present application, however, have found that if the unit derived from the specific aromatic compound is incorporated into the chain of the polymer in a proportion within such a certain range as described above, its impulse destructive strength will increase, though the crystallinity will decrease. The present invention is based on the unexpected fact that an improvement effect of the impulse destructive strength can be accomplished by introducing an extremely small amount of the aromatic unit into the ethylene polymer.

This improvement effect can be perceived within an extensive range of from low temperatures to high temperatures, and in particular, the aforesaid effect is remarkable at high temperatures.

Therefore, as is apparent from the foregoing, the crystallinity of the ethylene copolymer is also an important factor for improving dielectric strength and, in the present invention, it is preferred that the crystallinity thereof under X-ray diffraction is 30% or more.

In the present invention, to the ethylene copolymer or the composition of this copolymer and the above-mentioned ethylene polymer or copolymers, other compounds may be added, insofar as its properties are not impaired remarkably, and examples of such addable compounds include olefin polymers (inclusive of copolymers) except for the above-mentioned other ethylene polymers or copolymers; thermoplastic resins such as polyacrylonitriles, polyamides, polycarbonates, ABS resins, polystyrenes, polyphenylene oxides, polyvinyl alcohol resins, vinyl chloride resins, vinylidene chloride resins and polyester resins; petroleum resins; cumarone-indene resins; synthetic rubbers such as ethylene-propylene copolymer rubbers (EPR, EPDM and the like, SBR, NBR, butadiene rubber, IIR, chloroprene rubber, isoprene rubber, styrene-butadiene-styrene block copolymers; and natural rubbers. These compounds may be used alone or in a combination thereof.

Furthermore, in the present invention, additives may be added thereto so long as the effects are not damaged remarkably, and examples of such additives include an antioxidant, a lubricant, an ultraviolet stabilizer, a dispersant, a copper deactivator, a neutralizer, a plasticizer, a foam inhibitor, a flame retarder, a crosslinking auxiliary, an improver for flow properties, an improver for weld strength and a nucleating agent.

A crosslinking process for preparing the cross-linked power cables by use of the above ethylene copolymer may be a chemical crosslinking manner which is usually used extensively, and an irradiation cross-linking may also be acceptable.

The electrical insulating material containing the ethylene copolymer of the present invention which has been prepared as described above is excellent in dielectric strength, especially destructive strength to impulse voltage in a high-temperature range.

Further, the power cables of the present invention comprise the insulating layer containing the novel ethylene copolymer in which the aromatic compound for improving crosslinking properties and dielectric strength is present in the polymeric chains, and thus they can be employed as extra-high pressure electrical cables having high crosslinking properties, high crosslinking efficiency, high heat resistance and high dielectric strength, i.e., excellent impulse destructive strength.

EXAMPLES 1 TO 4

About 1,700 g of ethylene, each aromatic compound shown in Table 1 and a predetermined amount of n-hexane were placed in a 3.8-liter metallic autoclave-type reactor equipped with a stirrer in which an atmosphere had previously been replaced sufficiently with nitrogen and ethylene, and di-tertiary-butyl peroxide which was a polymerization initiator was then added thereto. Polymerization was afterward carried out at a polymerization temperture of 170° C. at a polymerization pressure of 1,600 kg/cm$^2$ for 60 minutes in order to prepare each ethylene copolymer containing a unit derived from an aromatic compound set forth in Table 1.

A portion of each produced polymer was dissolved in heated carbon tetrachloride and was then poured into a large amount of acetone to precipitate it again. This procedure was repeated several times to refine the polymer and the latter was then vacuum-dried.

The refined and dried polymer was molded into a sheet having a thickness of 500 μm by virtue of a heating compression operation, and the unit derived from the aromatic compound in each polymer thus produced as determined quantitatively by an infrared spectrophotometry on the basis of a compensation method of using a control sheet which was composed of an ethylene polymer not containing any aromatic compound and which had the same thickness.

The quantitative analysis of the unit derived from the aromatic compound contained in each produced polymer was carried out by the utilization of absorbance which was mainly based on aromatic rings in the vicinity of 1,600 cm−. Further, melt index of each produced polymer was measured in accordance with JIS K-6760.

For the respective produced polymers, impulse destructive strength was measured at 20° C. and 80° C., and the results are set forth in Table 1.

The measurement of the impulse destructive strength was carried out in the following manner: Each sample was a sheet having a thickness of 50 μm which was prepared by means of a heating compression molding. As an electrode system, there was used a so-called Mckeown electrode (FIG. 1) which is a kind of stationary electrode. A base plate 4 of the electrode system was made of polymethyl methacrylate and was provided at its central portion with a hole having a diameter of ½ inch. The electrodes used were stainless steel balls 1 each having a diameter of ½ inch. An about 8 mm×10 mm sample 2 was interposed between the electrodes. Spaces between the sample 2 and the electrodes were packed with a deaerated epoxy resin 3, and the latter was then cured. The thus constructed Mckeown electrode was dipped in a vessel filled with silicone oil and was then placed in a thermostat at 20° C. and 80° C., and measurement was carried out. A waveform used for the destruction was 1×40 μS negative impulse waveform. The waveform was observed by means of an oscilloscope, and data were collected on the basis of the destruction at its wave front and average values of 20 points or more were taken.

COMPARATIVE EXAMPLES 1 TO 3

The procedure of Example 1 was repeated to produce an ethylene copolymer shown in Table 1 and, for the latter, impulse destructive strength was measured. The results are set forth in Table 1.

The results in Table 1 indicate that the ethylene copolymers in Examples 1 to 4 regarding the present invention were more excellent in destructive strength than the ethylene homopolymer (comparative Example 1) in low and high temperatures, particularly in the high-temperature range.

On the other hand, when contents of aromatic compounds were outside of the range of the present invention in Comparative Examples 2 and 3, no improvement effect could be perceived.

Next, for the evaluation of electrical cables according to the present invention, the following examples were carried out.

EXAMPLES 5 TO 7

About 1,700 g of ethylene, each of aromatic compounds shown in Table 2 and a predetermined amount of n-hexane were placed in a 3.8-liter metallic autoclave-type reactor equipped with a stirrer in which an atmosphere had previously been replaced sufficiently with nitrogen and ethylene, and di-tertiary-butyl peroxide which was a polymerization initiator was then added thereto. Polymerization was carried out at a polymerization temperature of 170° C. at a polymerization pressure of 1,600 kg/cm$^2$ for 60 minutes in order to prepare each ethylene copolymer containing a unit derived from an aromatic compound set forth in Table 2.

A portion of each produced polymer was dissolved in heated carbon tetrachloride and was then poured into a large amount of acetone to precipitate it again. This procedure was repeated several times to refine the polymer and the latter was then vacuum-dried.

Table 2 exhibits properties of obtained copolymers.

Predetermined amounts of an organic peroxide crosslinking agent and an aging inhibitor were blended with each copolymer in order to prepare an insulating compound.

Figure 2:
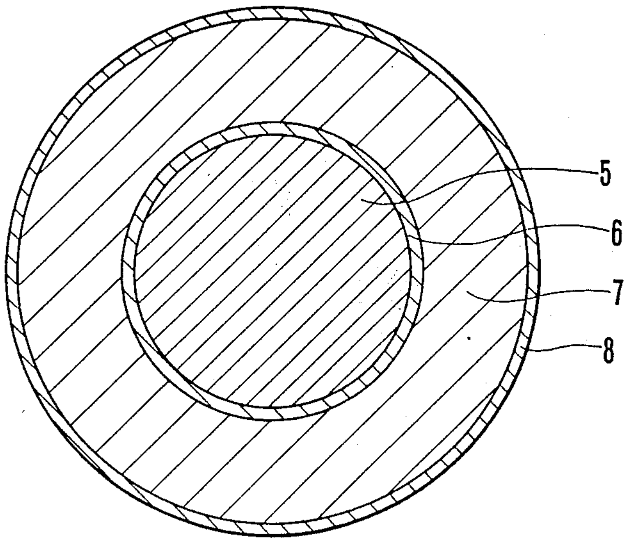
FIG. 2 is a cross-sectional view illustrating one example of a cable according to the present invention.

By the use of the thus prepared compound, a power cable was manufactured in the following manner: An inside semiconductive electric layer 6 having a thickness of 0.7 mm was formed around a conductor 5 having an area of 60 mm$^2$. Further, the formed layer was extrusion-coated with an insulating layer 7 comprising the above compound and having a thickness of 2.5 mm, and was moreover coated with an outside semiconductive electric layer 8. Afterward, dipping into a high-temperature oil was carried out to perform a crosslinking treatment, so that the power cable having a sectional structure shown in FIG. 2 was obtained.

Afterward, impulse destructive strength at 90° C. (in an ordinary manner), gel fraction (crosslinking percentage) and heat distortion percentage (heat resistance) were measured for each cable thus obtained, and the results are set forth in Table 2.

COMPARATIVE EXAMPLES 4 TO 6

Under the same polymerization conditions as in Examples 5 to 7, there were prepared ethylene homopolymers and copolymers from ethylene and comonomers shown in Table 2, amount of which were outside of the range of the present invention, and cables were manufactured with the copolymers in the same manner as in Examples 5 to 7. The results of evaluation are set forth in Table 2.

COMPARATIVE EXAMPLE 7

In the same manner as in Comparative Examples 6 to 8, a copolymer of ethylene and divinylbenzene was prepared. Properties of the divinylbenzene are set forth in Table 2. Further, this copolymer was used as an insulating layer in the same manner as in Examples 6 to 8 in order to form a power cable. The evaluation results of the power cable are set forth in Table 2.

The power cable formed in this comparative example has many fine lugs on the surface thereof, which meant that the smoothness on the cable surface was noticeably poor.

As is definite from the results in Table 2, the power cables in which the ethylene copolymers regarding the present invention prepared in Examples 5 to 7 were used as the insulating layers are more excellent in dielectric strength and heat resistance than the conventional crosslinked polyethylene power cable (Comparative Example 4).

Furthermore, in the cases of Comparative Examples 5 and 6 in which the contents of the aromatic compounds were outside of the range of the present invention, any improvement effect was not perceived.

In comparative Example 7, the divinylbenzene of a comonomer contained two carbon-carbon double bonds having an equal reactivity, and therefore crosslinking occurred partially between the polymer molecules in the course of the copolymerization with ethylene, so that a gel-like substance was produced. Probably for this reason, the surface of the formed power cable had a remarkably bad smoothness, which led to the deterioration in dielectric strength.

The respective tests were carried out as follows:

(1) Gel fraction

A molded article was ground up to a level of 20 meshes, and was then extracted with xylene at 120° C. for 10 hours in order to determine a residual percentage.

(2) Heat deformation percentage

A load of 2.64 kg was applied onto a sample in an oil bath at 120° C. and, after 30 minutes, a deformation percentage was measured.

(3) Crystallinity

An X-ray diffraction was employed.

TABLE 1

| | Aromatic Compound | | | | | Impulse Destructive Strength (MV/cm) | |
|---|---|---|---|---|---|---|---|
| | Name | Amount (g) | Amount of Produced Polymer (g) | Melt Index (g/10 min) | Content of Unit Derived from Aromatic Compound (mol %) | 20° C. | 80° C. |
| Example | | | | | | | |
| 1 | Allylstyrene | 1.2 | 142 | 4.3 | 0.11 | 6.21 | 4.42 |
| 2 | Allylindene | 10 | 253 | 3.3 | 0.10 | 6.18 | 4.06 |
| 3 | Allylbenzyl methyacrylate | 2.0 | 150 | 2.8 | 0.13 | 6.07 | 3.97 |
| 4 | 1-Phenyl-1-styrylethylene | 0.8 | 110 | 2.1 | 0.06 | 6.22 | 4.39 |
| Comparative Example | | | | | | | |
| 1 | None | — | 164 | 3.0 | 0.000 | 6.03 | 3.50 |
| 2 | Allylstyrene | 0.06 | 295 | 3.4 | 0.003 | 6.03 | 3.47 |
| 3 | Allylstyrene | 7.0 | 65 | 5.6 | 1.3 | 5.82 | 3.37 |

TABLE 2

| | Ethylene Copolymer | | | | | Crosslinked Electrical Cable | | |
|---|---|---|---|---|---|---|---|---|
| | Comonomer of Aromatic Compound | Content of Comonomer in Copolymer (mol %) | Double Bond in Copolymer (No./$10^3$ C) | MI (g/10 min) | Crystallinity (%) | Impulse Destructive Strength at 90° C. (KV) | Gel Fraction (%) | Heat Deformation Percentage (%) |
| Example | | | | | | | | |
| 5 | Allylstyrene | 0.12 | 0.56 | 3.1 | 53 | 430 | 86 | 9 |
| 6 | 4-Styryl-1-butene | 0.11 | 0.53 | 2.9 | 53 | 440 | 85 | 10 |
| 7 | 1-Phenyl-1-styrylethylene | 0.12 | 0.56 | 3.0 | 51 | 440 | 84 | 11 |
| Comparative Example | | | | | | | | |
| 4 | | | 0 | 3.0 | 57 | 330 | 68 | 38 |
| 5 | Allylstyrene | 0.003 | 0.14 | 3.2 | 56 | 330 | 73 | 34 |
| 6 | Allylstyrene | 1.3 | 6.1 | 5.1 | 38 | 290 | 95 | 4 |
| 7 | Divinylbenzene | 0.23 | 0.70 | 0.9 | 41 | 250 | 98 | 3 |

What is claimed is:

1. An electrical insulating material which comprises an ethylene copolymer prepared by subjecting, to a high-pressure radical polymerization, ethylene or a mixture of ethylene and at most 3 mol% of another unsaturated monomer in the presence of at least one one- to three-ring aromatic compound having at least two carbon-carbon double bonds which are different from each other in reactivity in radical polymerization in one molecule at a polymerization pressure of 500 to 4,000 kg/cm$^2$ at a polymerization temperature of 50° to 400° C., with said ethylene copolymer containing 0.005 to 1 mol% of a unit derived from said aromatic compound.

2. An electrical insulating material according to claim 1 wherein said ethylene copolymer has a melt index within the range of 0.05 to 50 g/10 minutes.

3. A power cable made from a crosslinked insulating layer which comprises an ethylene copolymer prepared by subjecting, to a high-pressure radical polymerization, ethylene or a mixture of ethylene and at most 3 mol% of another unsaturated monomer in the presence of one- to three-ring aromatic compounds having at least two carbon-carbon double bonds which are different from each other in reactivity in radical polymerization in one molecule at a polymerization pressure of 500 to 4,000 kg/cm$^2$ at a polymerization temperature of 50° to 400° C., with said ethylene copolymer containing 0.005 to 1 mol% of a unit derived from said aromatic compound.

4. A power cable according to claim 4 wherein said ethylene copolymer has a melt index within the range of 0.05 to 50 g/10 minutes.

5. An electrical insulating material which comprises an ethylene copolymer prepared by subjecting, to a high-pressure radical polymerization, ethylene or a mixture of ethylene and at most 3 mol% of another unsaturated monomer in the presence of at least one one- to three-ring aromatic compound having at least two carbon-carbon double bonds which are different from each other in reactivity in radical polymerization in one molecule at a polymerization pressure of 500 to 4,000 kg/cm$^2$ at a polymerization temperature of 50° to 400° C., with said ethylene copolymer containing 0.005 to 1 mol% of a unit derived from said aromatic compound wherein said aromatic compound has 11 to 30 carbons in all.

6. A power cable made from a crosslinked insulating layer which comprises an ethylene copolymer prepared by subjecting, to a high-pressure radical polymerization, ethylene or a mixture of ethylene and at most 3 mol% of another unsaturated monomer in the presence of one- to three-ring aromatic compounds having at least two carbon-carbon double bonds which are different from each other in reactivity in radical polymerization in one molecule at a polymerization pressure of 500 to 4,000 kg/cm$^2$ at a polymerization temperature of 50° to 400° C., with said ethylene copolymer containing 0.005 to 1 mol% of a unit derived from said aromatic compound; wherein said aromatic compound has 11 to 30 carbons in all.

* * * * *